WILLIAM C. LEYBURN.
Improvement in Thrashers and Grain-Separators.
No. 114,834.  Patented May 16, 1871.
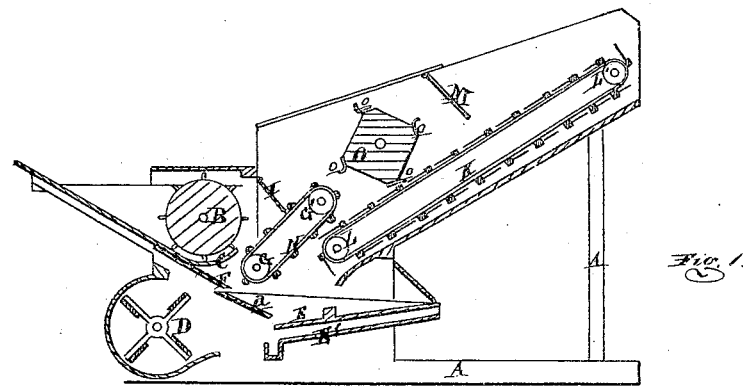
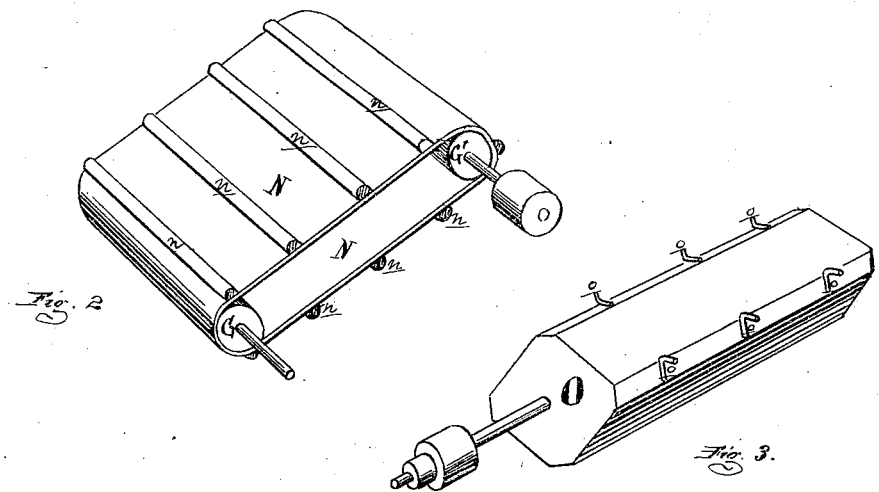

United States Patent Office.

WILLIAM C. LEYBURN, OF SPARTA, WISCONSIN.

Letters Patent No. 114,834, dated May 16, 1871.

IMPROVEMENT IN THRASHERS AND GRAIN-SEPARATORS.

The Schedule referred to in these Letters Patent and making part of the same.

*To whom it may concern:*

Be it known that I, WILLIAM C. LEYBURN, of Sparta, in the county of Monroe and State of Wisconsin, have invented a new and useful Improvement in Thrashers and Separators; and I do declare that the following is a true and accurate description thereof, reference being had to the accompanying drawing and to the letters of reference marked thereon and being a part of this specification, in which—

Figure 1 is a vertical longitudinal section of my improved thrasher and separator;

Figure 2 is a perspective view of my improved elevating-belt; and

Figure 3 is a similar view of my improved picker-drum.

Like letters indicate like parts in each figure.

The nature of my invention relates to certain improvements in the thrasher and separator for which Letters Patent of the United States were, on the 4th day of October, 1870, issued to Albert A. Walker, assignor to himself, George A. Fisk and William C. Leyburn; and It consists in the arrangement of its principal operating parts for the purpose of economizing space and securing efficiency in working, as more fully hereinafter set forth and described.

In the drawing—

A is the frame;
B, the cylinder;
C, the concave;
D, the blast-fan;
E, the screen;
E', the vibrating-shoe;
F, the inclined grain-board;
a, the hopper-board;
G G', the elevator drum-shafts;
I, the elevator-apron;
L L', the drums on which the agitating-rake K moves; and
M the picker-apron, all constructed and operating substantially as described in said Letters Patent.

In the said machine, so patented, the open elevating-rake, lettered H in said Letters Patent, consisting of a pair of endless belts running around the ends of the drum-shafts G G' and having transverse slats affixed at intervals thereto, permitted quantities of straw to pass through and fall on the screen E, causing it to choke and waste grain.

To remedy and overcome this difficulty I replace the said rake with a close endless belt, N, of canvas or other suitable material, to which I secure at intervals transverse slats n, and which takes up the straw delivered by the cylinder and delivers it to the agitating-rake and picker-drum above, permitting none to fall on the screens.

In the open reel, lettered J in said Letters Patent, it is found that the straw was wound up in the arms of the reel and so choked it as to hinder the operation of the pickers J'. This difficulty I overcome by replacing the said reel with a closed polygonal drum, O, provided with pickers o, substantially as described in the said Letters Patent.

In effecting the above-described improvements I am enabled, by giving the elevating-belt a more nearly vertical position than was possible with the first-described open reel J, to shorten the machine, making it less cumbersome and more compact.

The above arrangement allows the fan D to be placed nearer the shoe and sieves, for the purpose of bringing the blast more directly in line with the shoe E' and screen E.

What I claim as my invention, and desire to secure by Letters Patent, is—

The arrangement, within the frame A, of the picker-drum O, the rake K, the carrier N, the cylinder B, the fan D, the shoe E', and the screen E, all constructed and operating substantially as described and shown, for the purposes set forth.

WILLIAM C. LEYBURN.

Witnesses:
ED. WALRATH,
L. POOLE.